United States Patent
Arora et al.

(10) Patent No.: US 11,003,588 B2
(45) Date of Patent: May 11, 2021

(54) NETWORKED INPUT/OUTPUT MEMORY MANAGEMENT UNIT

(71) Applicants: ADVANCED MICRO DEVICES, INC., Santa Clara, CA (US); ATI TECHNOLOGIES ULC, Markham (CA)

(72) Inventors: Sonu Arora, Cherry Hill, NJ (US); Paul Blinzer, Bellevue, WA (US); Philip Ng, Markham (CA); Nippon Harshadk Raval, Markham (CA)

(73) Assignees: ADVANCED MICRO DEVICES, INC., Santa Clara, CA (US); ATI TECHNOLOGIES ULC, Markham (CA)

(*) Notice: Subject to any disclaimer, the term of this patent is extended or adjusted under 35 U.S.C. 154(b) by 0 days.

(21) Appl. No.: 16/548,692

(22) Filed: Aug. 22, 2019

(65) Prior Publication Data
US 2021/0056042 A1 Feb. 25, 2021

(51) Int. Cl.
*G06F 3/06* (2006.01)
*G06F 12/1027* (2016.01)
*G06F 13/16* (2006.01)

(52) U.S. Cl.
CPC ...... *G06F 12/1027* (2013.01); *G06F 13/1668* (2013.01); *G06F 2212/1024* (2013.01); *G06F 2212/68* (2013.01)

(58) Field of Classification Search
CPC .......... G06F 12/1027; G06F 2212/68; G06F 13/1668; G06F 2212/1024
USPC ........................................... 711/154
See application file for complete search history.

(56) References Cited

U.S. PATENT DOCUMENTS

| | | | |
|---|---|---|---|
| 2007/0168636 A1* | 7/2007 | Hummel | G06F 12/1081 711/202 |
| 2012/0017063 A1 | 1/2012 | Hummel et al. | |
| 2014/0281107 A1* | 9/2014 | Barroso | G06F 13/4045 710/313 |
| 2016/0246540 A1 | 8/2016 | Blagodurov et al. | |

(Continued)

OTHER PUBLICATIONS

"AMD I/O Virtualization Technology (IOMMU) Specification", Publication 48882, Revision 3.00, Dec. 2016, 270 pages.

(Continued)

*Primary Examiner* — Hashem Farrokh

(57) ABSTRACT

A networked input/output memory management unit (IOMMU) includes a plurality of IOMMUs. The networked IOMMU receives a memory access request that includes a domain physical address generated by a first address translation layer. The networked IOMMU selectively translates the domain physical address into a physical address in a system memory using one of the plurality of IOMMUs that is selected based on a type of a device that generated the memory access request. In some cases, the networked IOMMU is connected to a graphics processing unit (GPU), at least one peripheral device, and the memory. The networked IOMMU includes a command queue to receive the memory access requests, a primary IOMMU to selectively translate the domain physical address in memory access requests from the GPU, and a secondary IOMMU to translate the domain physical address in memory requests from the peripheral device.

20 Claims, 6 Drawing Sheets

(56) References Cited

U.S. PATENT DOCUMENTS

2017/0249106 A1\* 8/2017 Apfelbaum ......... G06F 12/1433
2019/0228145 A1 7/2019 Shanbhogue et al.

OTHER PUBLICATIONS

International Search Report and Written Opinion dated Nov. 25, 2020 in Application No. PCT/US2020/047376, 12 pages.

\* cited by examiner

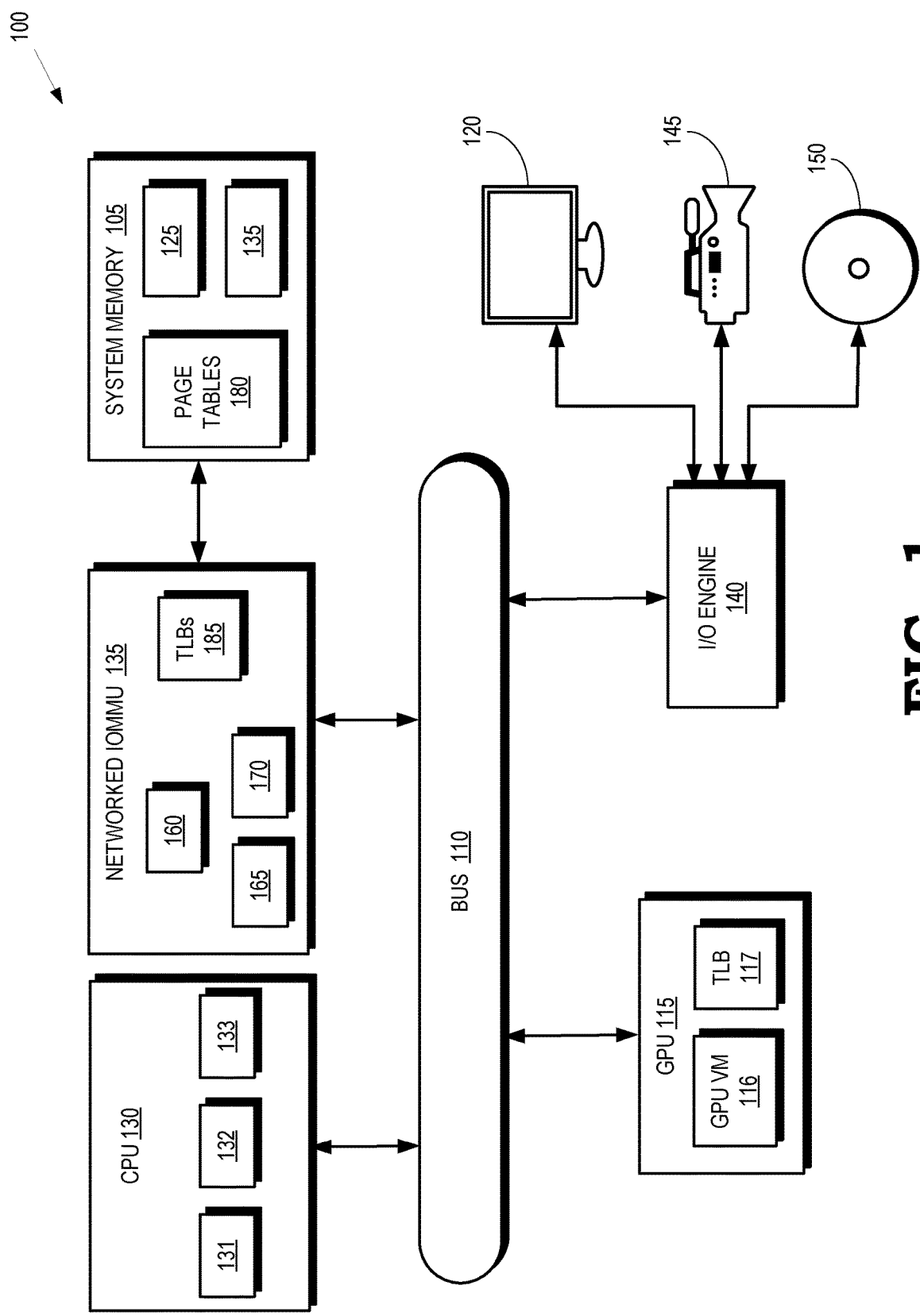

NETWORKED INPUT/OUTPUT MEMORY MANAGEMENT UNIT

BACKGROUND

A platform for a conventional graphics processing system includes a central processing unit (CPU), a graphics processing unit (GPU), one or more system memories (such as a dynamic random access memory, DRAM), and a bus to support communication between these entities. In some cases, the platform is implemented as a system-on-a-chip (SoC). The CPU initiates graphics processing by issuing draw calls to the GPU. In response to receiving a draw call, the GPU renders images for display using a pipeline formed of a sequence of programmable shaders and fixed-function hardware blocks. The system memory in the conventional graphics processing system is partitioned into a first portion that is visible to a host operating system (OS) executing on the graphics processing system and a second portion that is dedicated to the GPU, e.g., to provide a frame buffer. The second portion, which is sometimes referred to as a carveout or a GPU carveout, is not visible to the host OS. A GPU virtual manager (VM), which is managed by a graphics device driver, translates the virtual addresses in memory access requests to physical addresses in the system memory such as physical addresses in the GPU carveout region of the system memory. In some cases, the GPU VM performs the address translation using a corresponding translation lookaside buffer (TLB) that caches frequently requested address translations from a page table.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

FIG. 1 is a block diagram of a processing system according to some embodiments.

DETAILED DESCRIPTION

Figure 3:
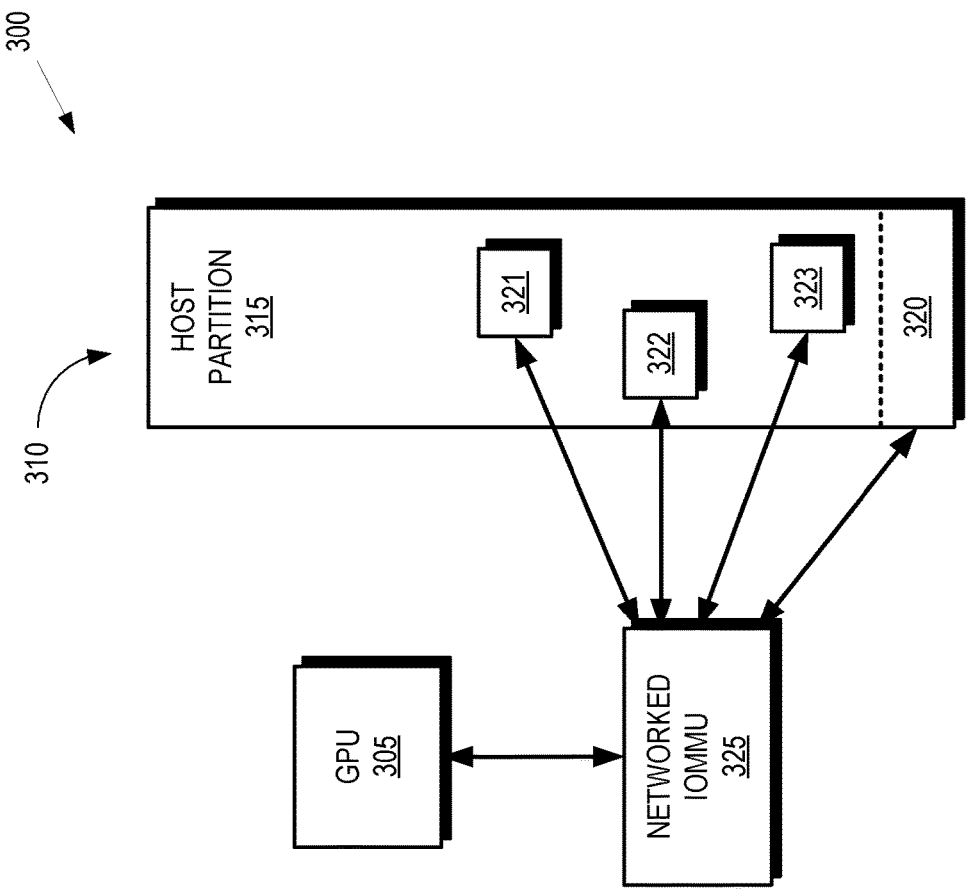
FIG. 3 is a block diagram of a portion of a processing system that implements a GPU carveout in conjunction with dynamic allocation of memory to a GPU according to some embodiments.

Changes in the security infrastructure and requirements driven by vendors of operating systems such as Microsoft Windows® are expected to impact the memory access performance of the processing system. For example, the size of the GPU carveout may be reduced to increase the amount of memory available for dynamic allocation to the GPU from the OS-controlled portion of the memory. For another example, virtualization-based security (VBS) provides memory protection against kernel mode malware by creating a secure partition in the system memory that is accessed using a first address translation layer managed by a device driver, e.g., using page tables and translation lookaside buffers (TLBs) to cache frequently requested address translations from the page tables. The page table and TLBs are associated with a GPU virtual manager (VM). A second address translation layer used to access the secure partition is controlled by a hypervisor or secure OS. The first address translation layer is contiguous and high performance. The second address translation layer handles physical memory management challenges such as memory fragmentation and access security. Consequently, the second address translation layer typically determines overall address translation performance. The second address translation layer is implemented in a system-wide input/output memory management unit (IOMMU) that supports address translation and system memory access protection on direct memory access (DMA) transfers from devices including the GPU and one or more peripheral devices.

In response to receiving a memory access request from the GPU, the first address translation layer translates a device-generated address in the memory access request to a domain physical address. The second address translation layer implemented in the IOMMU translates the domain physical address into a system physical address in the system memory. For example, the IOMMU assigns a domain context and a distinct set of page tables to each device in the processing system. When a device attempts to read or write system memory, the IOMMU intercepts the access and determines the domain context to which the device has been assigned. Additional permissions like read, write, execute, and the like are encoded into entries in the page tables and TLBs that are used to perform the second layer translation. The IOMMU therefore uses the TLB entries associated with the domain or the page tables associated with the device to determine whether the access is to be permitted and the location in system memory that is to be accessed. For example, in response to determining that the memory access request from the device is permitted, the IOMMU generates a physical address in the system memory from a domain physical address generated by the first address translation layer.

Funneling all memory access requests from peripheral devices and the GPU through the IOMMU leads to several problems. For example, the IOMMU provides service to real-time-dependent device client blocks such as video decoders, video encoders, and display framebuffer scanout circuitry, which have strict latency requirements. Performing page tablewalks for memory access requests from multiple entities at a single IOMMU introduces processing delays that increase latency. Moreover, a single IOMMU cannot be positioned near all of the peripheral devices and the GPU, so round trip times between some of the entities and the IOMMU further increase the processing latency at the IOMMU. Consequently, a central IOMMU cannot service all memory requests close to the single IOMMU and within hard access deadlines, e.g., with low latency. A system of distinct and disparate IOMMUs could be deployed proximate the different devices or the GPU. However, providing programming support for device-specific IOMMUs requires different programming models in system software, complicating the host OS and other system software architectures that use the IOMMU as a software-targeted system device.

FIGS. 1-7 disclose embodiments of a processing system that includes a graphics processing unit (GPU) and a networked input/output memory management unit (IOMMU) that satisfies the memory access latency requirements of peripheral devices using an architected programming model that views the networked IOMMU structure as a single device. The networked IOMMU receives memory access requests including a domain physical address generated from a device-generated address by a first address translation layer, e.g., a GPU VM and associated TLBs, that is managed by a device driver. The networked IOMMU selectively translates the domain physical address into a physical address in system memory using one of a plurality of IOMMUs that form the networked IOMMU. In some embodiments, the networked IOMMU include a first IOMMU that receives memory access requests from the GPU and peripheral devices via circuitry in the processing system such as display circuitry or camera circuitry. The networked IOMMU also includes one or more secondary IOMMUs that are connected to the primary IOMMU, which interfaces with the operating system (OS) or hypervisor (HV) software. The networked IOMMU implements the primary and secondary IOMMUs in a master-slave network, a star network, or other type of network such that the primary IOMMU acts as the front end for the networked IOMMU. Each of the secondary IOMMUs are disposed proximate to (or integrated within) corresponding circuitry associated with the one or more peripheral devices. For example, secondary IOMMUs for a display and a camera are disposed proximate display circuitry and camera circuitry. The location of the secondary IOMMUs are determined, at least in part, by latency requirements of the one or more peripheral devices.

In response to receiving a memory access request including a domain physical address from a first translation layer, the primary IOMMU selectively performs an address translation of the domain physical address or bypasses the address translation based on the type of device that provided the memory access request. In some embodiments, the primary IOMMU performs address translations of domain physical addresses associated with memory access requests from the GPU by performing a page tablewalk using a first set of page tables and a first translation lookaside buffer (TLB) associated with the primary IOMMU. The primary IOMMU bypasses the address translations of domain physical addresses in memory access requests received from peripheral devices. Instead, the primary IOMMU provides the memory access requests to a secondary IOMMU associated with the peripheral device that provided the memory access request. The secondary IOMMU performs address translations of domain physical addresses by performing page tablewalks using a second set of page tables and a second TLB associated with the second IOMMU. Some embodiments of the primary IOMMU include (or are associated with) a command queue that receives commands associated with the primary and secondary IOMMUs. The command queue allows system software to initiate page tablewalks and device rescans, which are processed in the primary IOMMU or selectively forwarded to one of the secondary IOMMUs, as discussed above. The command queue also supports rescan and synchronization of system software with the peripheral devices to ensure that software doesn't modify table data that is currently in flight.

FIG. 1 is a block diagram of a processing system 100 according to some embodiments. The processing system 100 includes or has access to a system memory 105 or other storage component that is implemented using a non-transitory computer readable medium such as a dynamic random access memory (DRAM). However, some embodiments of the memory 105 are implemented using other types of memory including static random access memory (SRAM), nonvolatile RAM, and the like. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes a graphics processing unit (GPU) 115 that renders images for presentation on a display 120. For example, the GPU 115 renders objects to produce values of pixels that are provided to the display 120, which uses the pixel values to display an image that represents the rendered objects. Some embodiments of the GPU 105 include multiple processing elements (not shown in FIG. 1 in the interest of clarity) that execute instructions concurrently or in parallel. The processing elements are referred to as compute units, processor cores, or using other terms. Some embodiments of the GPU 115 are used for general purpose computing. In the illustrated embodiment, the GPU 115 communicates with the memory 105 over the bus 110. However, some embodiments of the GPU 115 communicate with the memory 105 over a direct connection or via other buses, bridges, switches, routers, and the like. The GPU 115 executes instructions stored in the memory 105 and the GPU 115 stores information in the memory 105 such as the results of the executed instructions. For example, the memory 105 stores a copy 125 of instructions that represent a program code that is to be executed by the GPU 115.

Some embodiments of the GPU 115 perform virtual-to-physical address translations using a GPU VM 116 and one or more corresponding TLBs 117 (only one TLB 117 is shown in FIG. 1 for clarity). For example, in some cases, the GPU VM 116 and the TLB 117 are implemented as part of a first address translation layer that generates a domain physical address from a virtual address that is included in a memory access request received at the GPU 115 or generated by the GPU 115. Although the GPU VM 116 and the TLB 117 are depicted as integral parts of the GPU 115 in FIG. 1, some embodiments of the GPU VM 116 or the TLB 117 are implemented external to the GPU 115.

The processing system 100 also includes a central processing unit (CPU) 130 that implements multiple processing elements 131, 132, 133, which are collectively referred to herein as "the processing elements 131-133." The processing elements 131-133 execute instructions concurrently or in parallel. The CPU 130 is connected to the bus 110 and communicates with the GPU 115 and the memory 105 via the bus 110. The CPU 130 executes instructions such as program code 135 stored in the memory 105 and the CPU 130 stores information in the memory 105 such as the results of the executed instructions. The CPU 130 is also able to initiate graphics processing by issuing draw calls to the GPU 115.

An input/output (I/O) engine 140 handles input or output operations associated with the display 120, as well as other elements of the processing system 100 such as keyboards, mice, printers, external disks, and the like. In the illustrated embodiment, the I/O engine 140 also handles input and output operations associated with a camera 145. The I/O engine 140 is coupled to the bus 110 so that the I/O engine 140 is able to communicate with the memory 105, the GPU 115, or the CPU 130. In the illustrated embodiment, the I/O engine 140 reads information stored on an external storage component 150, which is implemented using a non-transitory computer readable medium such as a compact disk (CD), a digital video disc (DVD), and the like. The I/O engine 140 also writes information to the external storage component 150, such as the results of processing by the GPU 115 or the CPU 130.

The processing system 100 includes a networked I/O memory management unit (IOMMU) 155 that includes a set of IOMMUs for processing memory access requests from devices such as the GPU 115 and peripheral devices including the display 120, the camera 145, and the external storage component 150. The memory access requests include a device-generated address such as a virtual address that is used to indicate a location in the system memory 105. Some embodiments of the networked IOMMU 155 receive memory access requests that include a domain physical address generated by a first address translation layer that is managed by a driver such as a graphics driver implemented by the GPU 115. For example, the first address translation layer can include the GPU VM 116 and the TLB 117. The networked IOMMU 155 selectively translates the domain physical address into a physical address in the system memory 105 using one of the set of IOMMUs that is selected based on a type of a device that generated the memory access request. The types include a first type for the GPU 115 and a second type for peripheral devices such as the display 120, the camera 145, and the external storage component 150.

In the illustrated embodiment, the networked IOMMU 135 includes a primary IOMMU 160 that receives the memory access requests from the first address translation layer and secondary IOMMUs 165, 170 connected to the primary IOMMU 160 and disposed proximate to circuitry (not shown in FIG. 1 in the interest of clarity) associated with the peripheral devices such as the display 120, the camera 145, and the external storage component 150. The primary IOMMU 160 and the secondary IOMMUs 165, 170 are deployed as a master-slave network, a star network, or other type of network that allows the memory access requests to be received initially by the primary IOMMU 160 and then selectively distributed, if necessary, to the secondary IOMMUs 165, 170. Some embodiments of the primary IOMMU 160 are responsible for passing through TLB shoot-downs or other software commands to the secondary IOMMUs 165, 170.

The networked IOMMU 135 performs address translations using address translations that are stored in page tables 180. Each process that is executing on a device in the processing system 100 has a corresponding page table. The page table 180 for a process translates the device-generated (e.g., virtual) addresses that are being used by the process to physical addresses in the system memory 105. The primary IOMMU 160 and the secondary IOMMUs 165, 170 independently perform tablewalks of the page tables 180 to determine translations of addresses in the memory access requests. Translations that are frequently used by the networked IOMMU 135 are stored in TLBs 185, which are used to cache frequently requested address translations. Separate TLBs 185 are associated with the primary IOMMU 160 and the secondary IOMMUs 165, 170. Entries including frequently used address translations are written from the page tables 180 into the TLBs 185 for the primary IOMMU 160 and the secondary IOMMUs 165, 170. The primary IOMMU 160 and the secondary IOMMUs 165, 170 are therefore independently able to access the address translations from the TLB 185 without the overhead of searching for the translation in the page table 180. Entries are evicted from the TLBs 185 to make room for new entries according to a TLB replacement policy. The TLB 185 is depicted as an integrated part of the networked IOMMU 135 in FIG. 1. However, in other embodiments, the TLB 185 is implemented in a separate entity accessible by the networked IOMMU 135. In some embodiments, the TLB 117 and the TLB 185 are implemented in a single architecture, although this is not required in all embodiments.

Figure 2:
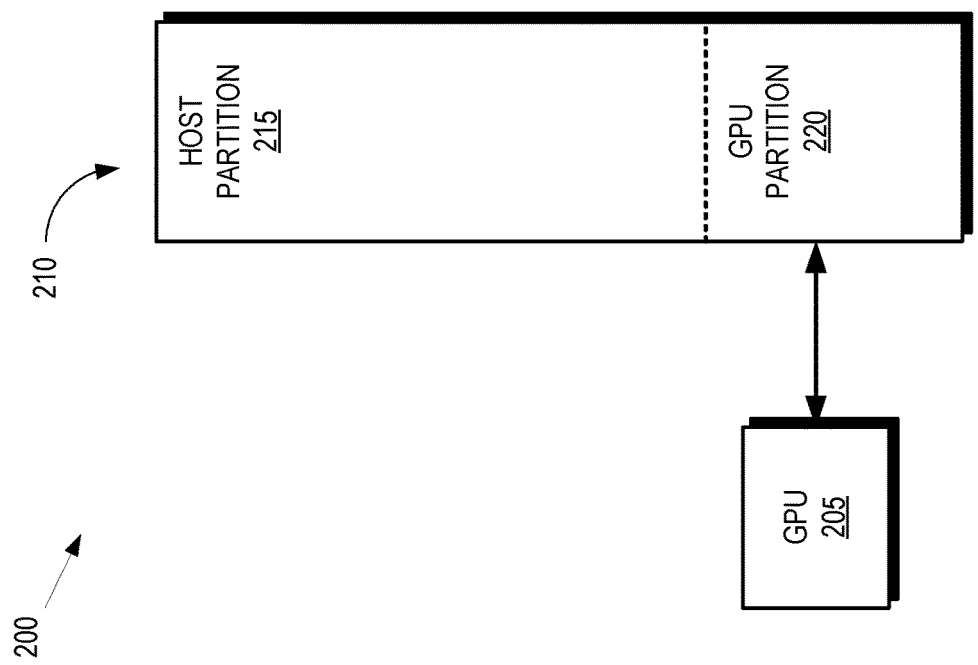
FIG. 2 is a block diagram of a portion of a processing system that implements a conventional GPU carveout in memory.

FIG. 2 is a block diagram of a portion 200 of a processing system that implements a conventional GPU carveout in memory. The portion 200 includes a GPU 205 and a system memory 210. In the illustrated embodiment, the system memory 210 is partitioned into a host partition 215 and a GPU partition 220, which is also referred to as a GPU carveout. For example, the GPU partition 220 includes up to 2 GB of dedicated frame buffer if the system memory 210 includes a total of 8 GB or more. The GPU partition 220 is reserved for exclusive access by the GPU 220. The GPU partition 220 is not visible to the OS executing on the processing system. Consequently, the GPU partition 220 may be underutilized when the processing system is running applications that are non-graphics centric or otherwise do not consume significant resources of the GPU 220. As discussed herein, the GPU partition 220 cannot be allocated to other applications because the GPU partition 220 is not visible to the OS.

FIG. 3 is a block diagram of a portion 300 of a processing system that implements a GPU carveout in conjunction with dynamic allocation of memory to a GPU according to some embodiments. The portion 300 includes a GPU 305 and a system memory 310. In the illustrated embodiment, the system memory 310 is partitioned into a host partition 315 and a GPU partition 320. The size of the GPU partition 320 is limited to a predetermined (relatively small) size. In some embodiments, the GPU partition 320 includes 3% or less of system memory 310, e.g., 256 MB for an 8 GB system memory 310. The processing system compensates for the small size of the GPU partition 320 by dynamically allocating portions 321, 322, 323 (referred to herein as "the portions 321-323") of the host partition 315.

The portion 300 of the processing system includes a networked IOMMU 325 to translate device-generated addresses in memory access requests to physical addresses in the GPU partition 320 or the portions 321-323. For example, a GPU VM and associated TLB can translate a virtual memory address in a memory access request to a domain physical address and provide the memory access request including the domain physical address to the networked IOMMU 325. In some embodiments, page tables are defined in response to allocation of the portion 321-323 to processes executing on the GPU 305. For example, virtual addresses used by a process executing on the GPU 305 are mapped to physical addresses in the portion 321 that is allocated to the process. The mapping is stored in entries of the page table associated with the process. The networked IOMMU 325 includes a set of IOMMUs and the networked IOMMU 325 selectively translates the domain physical address into a physical address in the system memory 310 using one of the set of IOMMUs that is selected based on a type of a device that generated the memory access request. For example, a primary IOMMU in the set of IOMMUs translates the domain physical address into the physical address in the system memory 310 in response to receiving a memory access request from the GPU 305. For another example, the primary IOMMU bypasses the translation and provides the memory access request to a secondary IOMMU for translation in response to receiving a memory access request from a peripheral device such as a display or camera.

Figure 4:
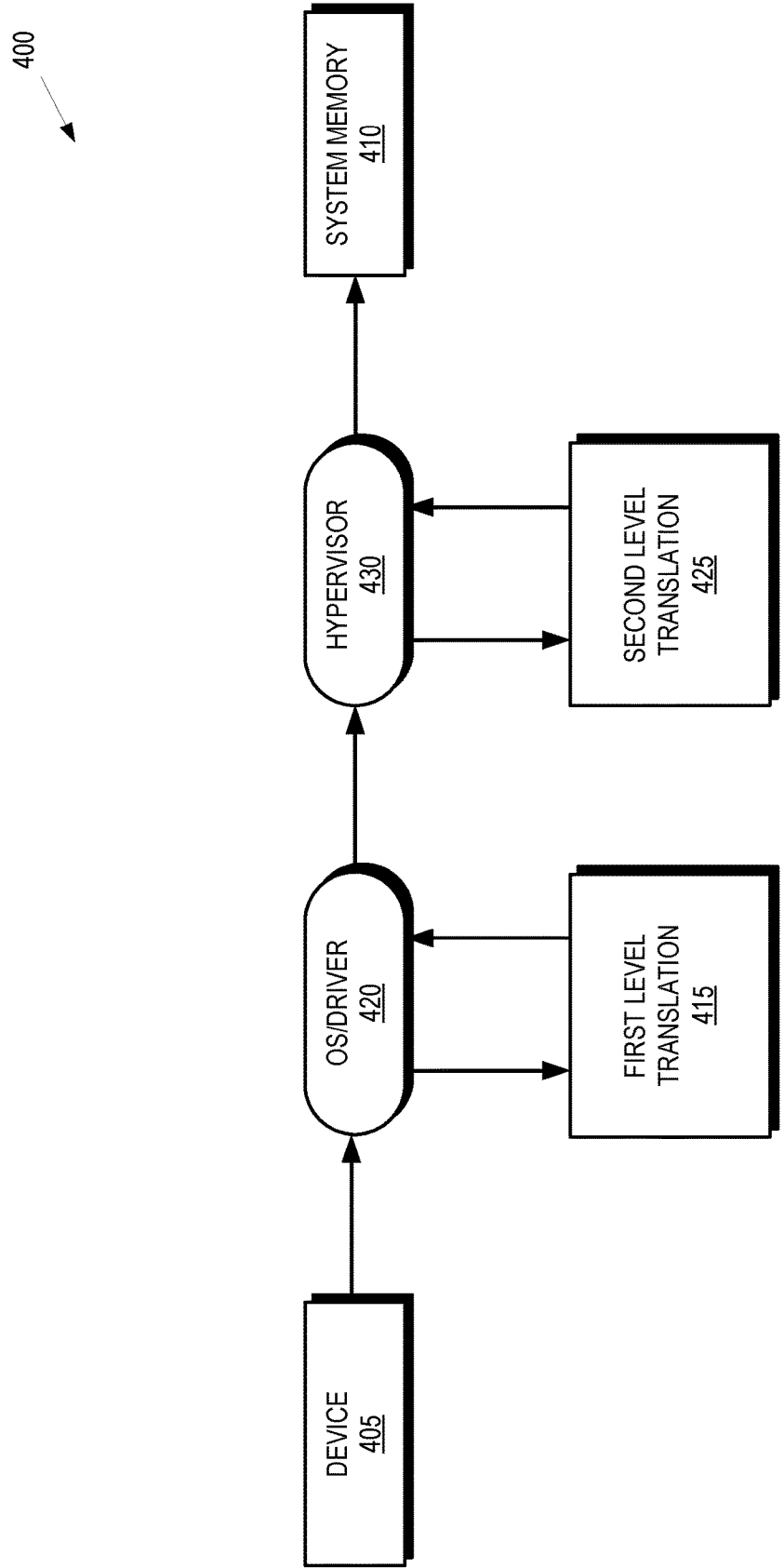
FIG. 4 is a block diagram illustrating translation of device-generated addresses in a memory access request according to some embodiments.

FIG. 4 is a block diagram illustrating translation 400 of device-generated addresses in a memory access request according to some embodiments. The translation 400 is performed in some embodiments of the processing system 100 shown in FIG. 1 and the portion 300 of the processing system shown in FIG. 3. In the illustrated embodiment, a device 405 issues a memory access request such as a request to write information to a system memory 410 or a request to read information from the system memory 410. The device 405 represents some embodiments of the GPU 115 shown in FIG. 1 or peripheral devices such as the display 120, the camera 145, or the external storage medium 150 shown in FIG. 1.

The memory access request includes a device-generated address such as a virtual address used by an application executing on or associated with the device 405. In the illustrated embodiment, a virtualization based security (VBS) provides memory protection (e.g., against kernel mode malware) using a two-level translation process that includes a first level translation 415 managed by an OS or device driver 420 and a second layer translation 425 managed by a hypervisor 430. The first level translation 415 translates a device-generated address such as a virtual address in the memory access request to a domain physical address such as a GPU physical address. In some embodiments, the first level translation 415 is performed by a GPU VM and associated TLB, as discussed herein. The domain physical address is passed to the second level translation 425, which translates the domain physical address into a physical address that indicates a location within the system memory 410. As discussed herein, the second level translation 425 also verifies that the device 405 is authorized to access the region of the system memory 410 indicated by the physical address, e.g., using permission information that is encoded into entries in associated page tables and translation lookaside buffers (TLBs) that are used to perform the second layer translation 425.

Figure 5:
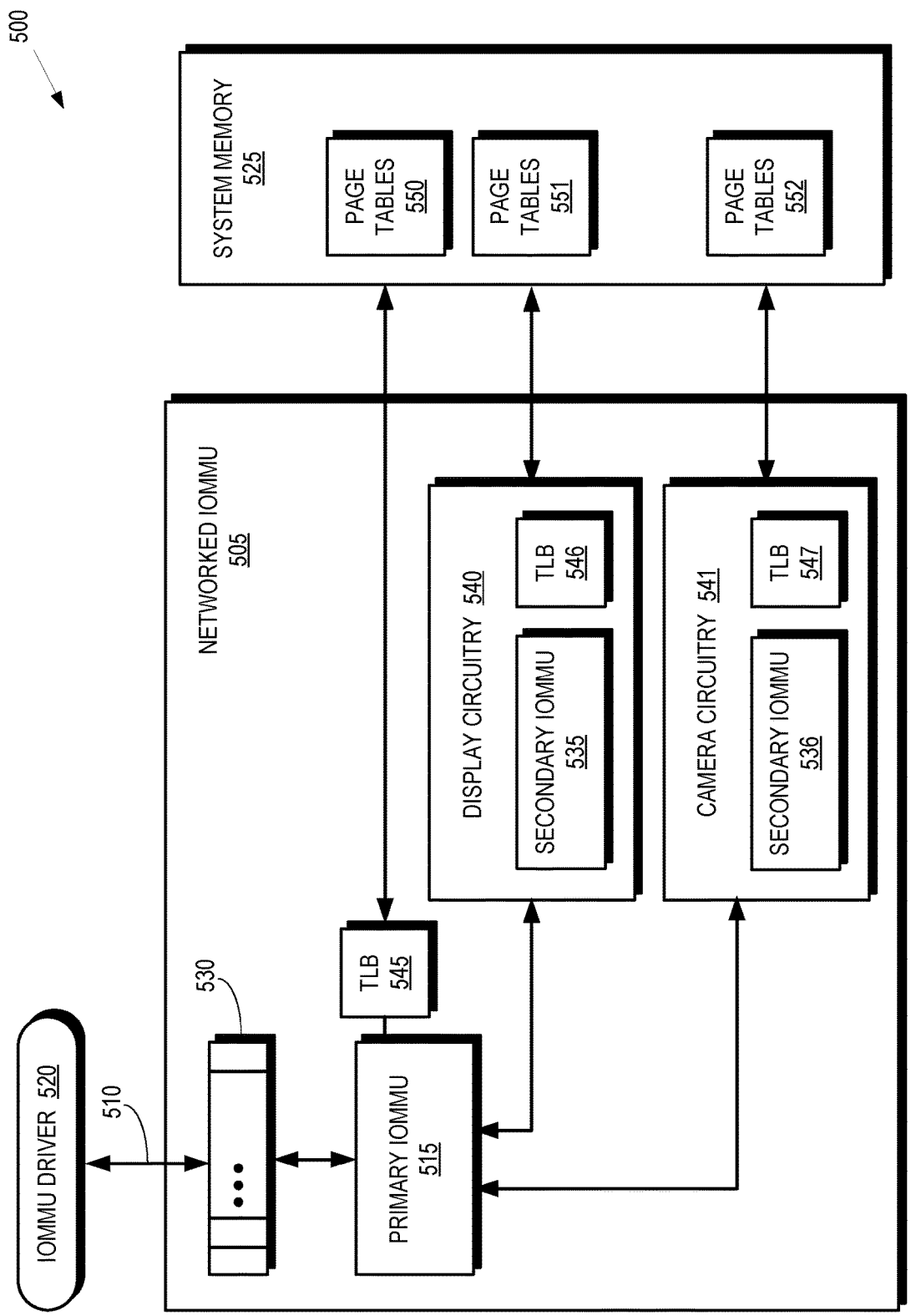
FIG. 5 is a block diagram of a portion of a processing system that implements a networked IOMMU according to some embodiments.

FIG. 5 is a block diagram of a portion 500 of a processing system that implements a networked IOMMU 505 according to some embodiments. The portion 500 represents a portion of some embodiments of the processing system 100 shown in FIG. 1 and the networked IOMMU 505 represents some embodiments of the networked IOMMU 135 shown in FIG. 1 and the networked IOMMU 325 shown in FIG. 3.

The networked IOMMU 505 receives memory access requests via a unified software interface 510 to a primary IOMMU 515. In the illustrated embodiment, the memory access requests are provided by software such as an IOMMU driver 520 that is implemented in the processing system. The IOMMU driver 520 receives the memory access requests from a first address translation layer, e.g., an address translation layer that includes a GPU VM and associated TLB (not shown in FIG. 5 in the interest of clarity). The first address translation layer translates a device-generated address such as a virtual memory address to a domain physical address and provides the memory access request including the domain physical address to the networked IOMMU 505. The device-generated addresses (e.g., virtual addresses) are used by the software to indicate locations within a system memory 525.

The primary IOMMU 515 and the unified software interface 510 support an architected programming model that is targeted as a single device by system software (such as the IOMMU driver 520). Thus, the programming model does not require dedicated control mechanisms and software to operate disparate IOMMU hardware units for real time and conventional direct memory access (DMA) processing. However, some device client blocks that require IOMMU services to satisfy worst case latency requirements, e.g., for video decoder in code, display frame buffer scan out, and the like. A single primary IOMMU 515 is not always able to satisfy the latency requirements.

At least in part to address the worst case latency requirements of device client blocks, the networked IOMMU 505 includes one or more secondary IOMMU 535, 536 that are deployed proximate corresponding device client blocks for peripheral devices. In the illustrated embodiment, the peripheral device circuitry includes display circuitry 540 that supports communication with a display such as the display 120 shown in FIG. 1 and camera circuitry 541 that supports communication with a camera such as the camera 145 shown in FIG. 1. The secondary IOMMUs 535, 536 are integrated in the corresponding circuitry 540, 541. However, in some embodiments, the secondary IOMMUs 535, 536 are deployed proximate the corresponding circuitry 540, 541 at a (physical or logical) distance that is determined based on the latency requirements of the corresponding circuitry 540, 541. Lower latency requirements imply that the secondary IOMMUs 535, 536 are deployed (physically or logically) closer to the corresponding circuitry 540, 541. The primary IOMMU 515 and the secondary IOMMUs 535, 536 are implemented in a master-slave relationship, a star network, or other configuration that allows the primary IOMMU 515 to act as a single device to receive memory access requests via the unified software interface 510.

In operation, the primary IOMMU 515 performs address translations for memory access requests from devices of the first type (e.g., requests from a GPU) and bypasses performing address translations for memory access requests from devices of a second type (e.g., requests from peripheral devices). The primary IOMMU 515 forwards memory access requests from devices of the second type to corresponding secondary IOMMUs 535, 536. For example, the primary IOMMU 515 forwards memory access requests associated with a display to the secondary IOMMU 535 and memory access requests associated with a camera to the secondary IOMMU 536. Thus, the IOMMU driver 520 issues a single command to access the system memory 525 (e.g., a single memory access request) via the interface 510. The single command is then selectively handled by either the primary IOMMU 515 or one of the specialized secondary IOMMUs 535, 536. The IOMMU driver 520 therefore implements the access policy without being required to address the dedicated IOMMU 515, 535, 536 separately or independently.

In response to receiving a memory access request from a device of the appropriate type, the primary IOMMU 515 or the secondary IOMMUs 535, 536 access entries in corresponding TLBs 545, 546, 547 (collectively referred to herein as "the TLBs 545-547") to attempt to locate a translation of the address included in the memory access request. The entries in the TLBs 545-547 encode information indicating whether the requesting device is permitted to access the system memory 525. If the address hits in the corresponding TLB 545-547 and the device has the appropriate permissions, the memory access request is forwarded to the system memory 525. If the address misses in the corresponding TLB 545-547, the memory access request is forwarded to a corresponding page table 550, 551, 552, which returns the appropriate translation of the address. Entries in the TLBs 545-547 are updated based on the replacement policy implemented by the TLBs 545-547. If the device does not have the appropriate permissions, the memory access request is denied.

Some embodiments of the networked IOMMU 505 include a command queue 530 that receives memory access requests from the IOMMU driver 520 and stores the access requests before they are issued to the primary IOMMU 515. The command queue 530 allows system software to initiate page table and device re-scans that are forwarded to the primary IOMMU 515 or the secondary IOMMUs 535, 536, which are therefore able to cache relevant data in the corresponding TLBs 545-547. Some embodiments of the command queue 530 also allow rescans and synchronization of system software with hardware units to ensure that the software does not modify table data that is in flight.

Figure 6:
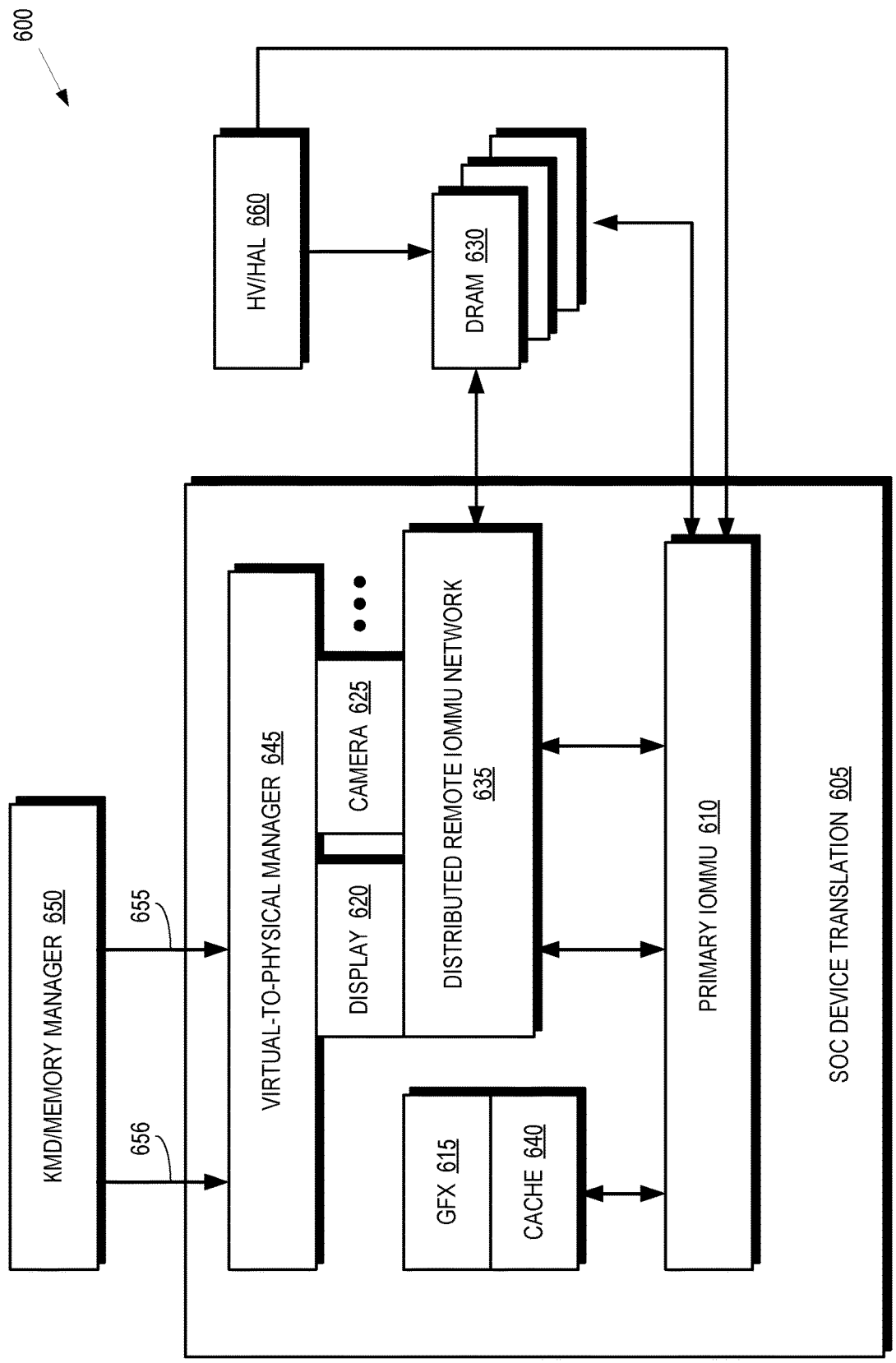
FIG. 6 is a block diagram of a usage model of a processing system that implements a system-on-a-chip (SOC) device translation block according to some embodiments.

FIG. 6 is a block diagram of a usage model 600 of a processing system that implements a system-on-a-chip (SOC) device translation block 605 according to some embodiments. The usage model 600 is implemented in some embodiments of the processing system 100 shown in FIG. 1, the portion 300 of the processing system shown in FIG. 3, and the portion 500 of the processing system shown in FIG. 5.

The SOC device translation block 605 includes a primary IOMMU 610 that receives memory access requests from devices including a graphics pipeline (GFX) 615 in a GPU and peripheral devices such as a display 620, a camera 625, and the like. In some embodiments, the memory access requests are received from a first address translation layer, e.g., an address translation layer that is implemented using a GPU VM and TLB, and the memory access requests include a domain physical address generated by the first address translation layer. The memory access requests are used to access system memory such as DRAM 630. As discussed herein, the primary IOMMU 610 selectively performs address translations on the addresses included in the memory access requests based on the type of the device that issued the request. Memory access requests from device types that are not translated by the primary IOMMU 610 are forwarded to a distributed remote IOMMU network 635 that includes one or more IOMMUs associated with the display 620, the camera 625, and other peripheral devices. Some embodiments of the distributed remote IOMMU network 635 are implemented using the secondary IOMMUs 535, 536 shown in FIG. 5. The SOC device translation block 605 also includes a translation cache 640 for translating addresses associated with requests generated by the GFX 615. A virtual-to-physical manager 645 is used to support peripheral devices such as the display 620, the camera 625, and any other peripheral devices.

In operation, a kernel mode driver or memory manager 650 provides signaling 655 to configure address translation tables such as page tables that are used to translate virtual addresses to GPU physical addresses (or domain physical addresses), e.g., using a first layer of address translation performed by a GPU VM and associated TLB. The memory manager 650 also provides virtual addresses 656 such as GPU virtual addresses to the virtual-to-physical manager 645. A hypervisor or hypervisor abstraction layer (HAL) 660 manages system physical page tables and access permissions stored in the DRAM 630. The HAL 660 also configures the primary IOMMU 610 in the SOC device translation layer 605. The GFX 615 attempts to translate virtual addresses using the translation cache 640. If the attempt hits in the translation cache 640, the returned address translation is used for further processing. If the attempt misses in the translation cache 640, the request is forwarded to the primary IOMMU 610, which handles the subsequent address translation as discussed herein. The primary IOMMU 610 and the distributed remote IOMMU network 635 are also able to access the DRAM 630 to perform page table walks, as discussed herein.

Figure 7:
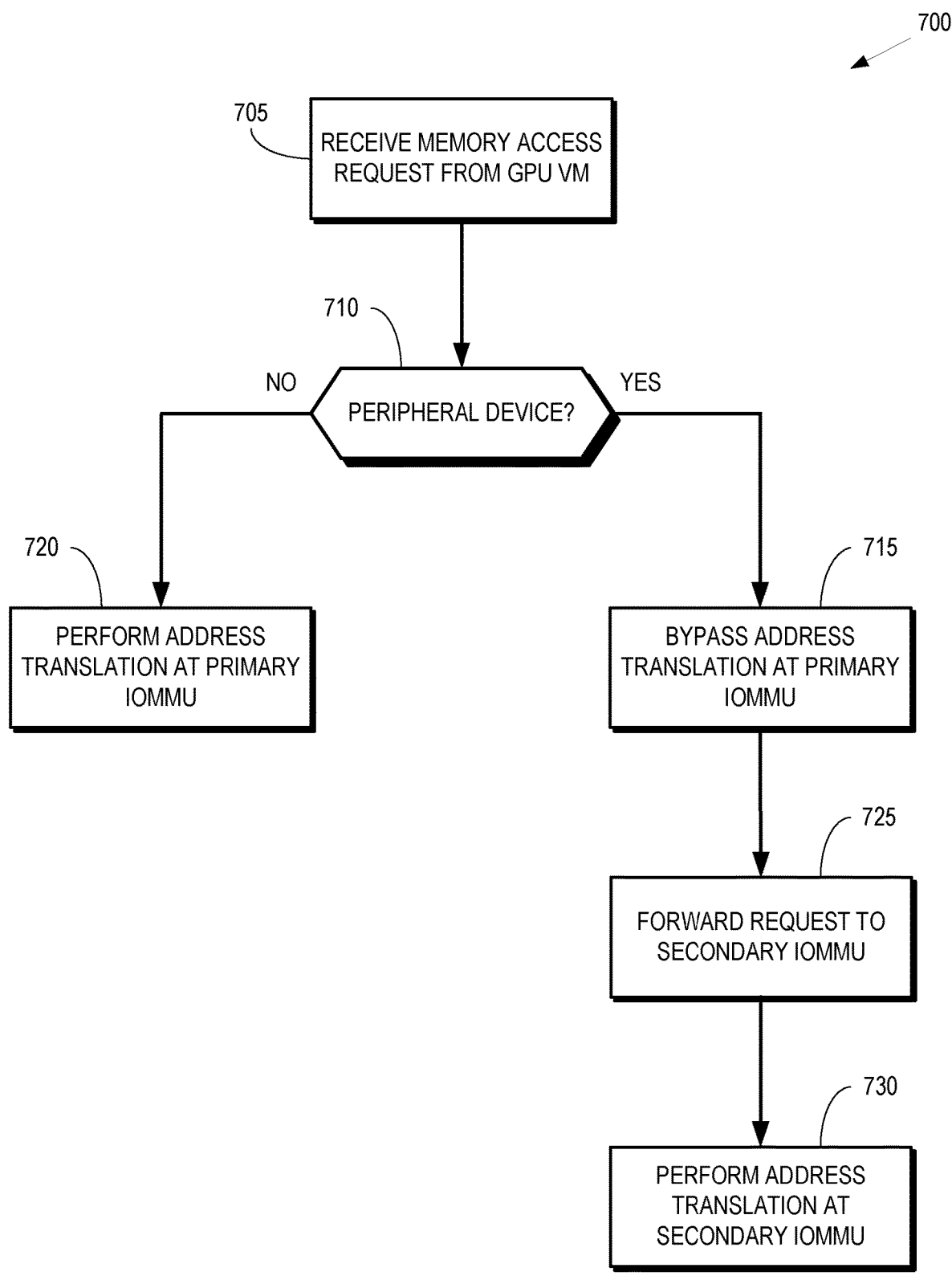
FIG. 7 is a flow diagram of a method of selectively performing address translations and a primary IOMMU or a secondary IOMMU according to some embodiments.

FIG. 7 is a flow diagram of a method 700 of selectively performing address translations and a primary IOMMU or a secondary IOMMU according to some embodiments. The method 700 is implemented in a networked IOMMU such as some embodiments of the networked IOMMU 135 shown in FIG. 1, the networked IOMMU 325 shown in FIG. 3, the second level translation 425 shown in FIG. 4, the networked IOMMU 505 shown in FIG. 5, and the SOC device translation block 605 shown in FIG. 6.

At block 705, the networked IOMMU receives a memory access request from a device of a particular type. Examples of device types include a graphics processor type, a peripheral device type, and the like. In some embodiments, the memory access request is received from a first address translation layer, e.g., an address translation layer that is implemented using a GPU VM and TLB, and the memory access request includes a domain physical address generated by the first address translation layer.

At decision block 710, the networked IOMMU determines the type of device that issued the memory access request, e.g., based on information included in the request. If the type of device that issued the memory access request is a peripheral device, the method 700 flows to block 715. If the type of device that issued the memory access request is a GPU device, the method 700 flows to block 720.

At block 715, the primary IOMMU in the networked IOMMU bypasses address translation for memory access requests from peripheral device types. The method 700 then flows to block 725 and the primary IOMMU forwards the memory access request to a secondary IOMMU associated with the requesting device. For example, the primary IOMMU forwards the memory access request to a secondary IOMMU integrated in display circuitry in response to the memory access request being from a display. The secondary IOMMU then performs the address translation at block 730.

At block 720, the primary IOMMU in the networked IOMMU performs the requested address translation for memory access requests from the GPU.

A computer readable storage medium includes any non-transitory storage medium, or combination of non-transitory storage media, accessible by a computer system during use to provide instructions and/or data to the computer system. Such storage media include, but are not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus, comprising:
a networked input/output memory management unit (IOMMU) comprising a plurality of IOMMUs,
wherein the networked IOMMU is configured to:
receive a memory access request that includes a domain physical address generated by a first address translation layer; and
selectively translate the domain physical address into a physical address in a system memory using one of the plurality of IOMMUs that is selected based on a type of a device that generated the memory access request.

2. The apparatus of claim 1, wherein the device is a graphics processing unit (GPU) or a peripheral device of a plurality of peripheral devices, and wherein the plurality of IOMMUs comprise:
a primary IOMMU configured to receive the memory access request from the first address translation layer; and
a secondary IOMMU connected to the primary IOMMU and disposed proximate to circuitry associated with the device.

3. The apparatus of claim 2, wherein:
the primary IOMMU performs address translation of the domain physical address in response to the memory access request being received from the GPU; and
the secondary IOMMU performs the address translation in response to the memory access request being received from the peripheral device.

4. The apparatus of claim 3, wherein the primary IOMMU performs the address translation of the domain physical address received from the GPU by performing a page table walk using a first translation lookaside buffer (TLB) and a first set of page tables associated with the primary IOMMU.

5. The apparatus of claim 4, wherein:
the primary IOMMU provides the memory access request to the secondary IOMMU in response to the memory access request being received from the peripheral device; and
the secondary IOMMU performs the address translation of the domain physical address in the memory access request received from the primary IOMMU by performing the page table walk using a second TLB and a second set of page tables associated with the secondary IOMMU.

6. The apparatus of claim 2, wherein a location of the second IOMMU relative to the circuitry associated with the peripheral device is determined based on a latency requirement of the peripheral device.

7. The apparatus of claim 6, further comprising:
a plurality of secondary IOMMUs connected to the primary IOMMU, wherein the plurality of secondary IOMMUs are deployed proximate circuitry associated with a plurality of peripheral devices, each of the plurality of secondary IOMMUs configured to perform address translations of domain physical addresses in memory access requests received from the circuitry associated with a corresponding one of the plurality of peripheral devices.

8. The apparatus of claim 7, wherein the plurality of secondary IOMMUs are integrated into the circuitry associated with the plurality of peripheral devices.

9. The apparatus of claim 2, further comprising:
a command queue configured to receive memory access requests from the first address translation layer and selectively provide the memory access requests to the primary IOMMU or the secondary IOMMU based on the type of the device that generated the memory access request.

10. A method, comprising:
receiving, at a networked input/output memory management unit (IOMMU) comprising a plurality of IOMMUs, a memory access request that includes a domain physical address generated by a first address translation layer;
selecting one of the plurality of IOMMUs based on a type of a device that generated the memory access request; and selectively translating the domain physical address into a physical address in a system memory using the selected one of the plurality of IOMMUs.

11. The method of claim 10, wherein:
the device is a graphics processing unit (GPU) or a peripheral device of a plurality of peripheral devices; and
receiving the memory access request comprises receiving the memory access request from the first address translation layer at a primary IOMMU in the plurality of IOMMUs.

12. The method of claim 11, wherein selecting the one of the plurality of IOMMUs comprises:
selecting the primary IOMMU in response to the device being the GPU; and
selecting a secondary IOMMU in response to the device being the one of the plurality of peripheral devices, wherein the secondary IOMMU is connected to the primary IOMMU and disposed proximate to circuitry associated with the one of the plurality of peripheral devices.

13. The method of claim 12, further comprising:
performing address translation of the domain physical address at the primary IOMMU in response to the memory access request being received from the GPU.

14. The method of claim 13, wherein performing the address translation of the domain physical address at the primary IOMMU comprises performing a page table walk using a first translation lookaside buffer (TLB) and a first set of page tables associated with the primary IOMMU.

15. The method of claim 13, further comprising:
performing the address translation at the secondary IOMMU in response to the memory access request being received from the peripheral device.

16. The method of claim 15, further comprising:
providing the memory access request from the primary IOMMU to the secondary IOMMU in response to the memory access request being received from the peripheral device, and
wherein performing the address translation of the domain physical address at the secondary IOMMU comprises performing a page table walk using a second TLB and a second set of page tables associated with the secondary IOMMU.

17. The method of claim 12, further comprising:
receiving memory access requests at a command queue from the first address translation layer; and
selectively providing the memory access requests from the command queue to the primary IOMMU or the secondary IOMMU based on the type of the device that generated the memory access request.

18. A networked input/output memory management unit (IOMMU) configured to be connected to a graphics processing unit (GPU), at least one peripheral device, and a memory, the networked IOMMU comprising:
a command queue configured to receive a memory access request from a first address translation layer, wherein the memory access request includes a domain physical address generated by the first address translation layer;
a primary IOMMU configured to translate the domain physical address to a physical address in the memory in response to the memory access request being received from the GPU; and
at least one secondary IOMMU configured to translate the domain physical address to the physical address in the memory in response to the memory access request being received from the at least one peripheral device.

19. The networked IOMMU of claim 18, wherein:
the primary IOMMU performs the translation of the domain physical address received from the GPU by performing a page table walk using a first translation lookaside buffer (TLB) and a first set of page tables associated with the primary IOMMU; and
the at least one secondary IOMMU performs the translation of the domain physical address in the memory access request by performing the page table walk using a second TLB and a second set of page tables associated with the secondary IOMMU.

20. The networked IOMMU of claim 18, wherein at least one location of the at least one second IOMMU relative to the at least one peripheral device is determined based on a latency requirement of the at least one peripheral device.

* * * * *